Patented Aug. 22, 1950

2,519,492

UNITED STATES PATENT OFFICE 2,519,492

HYDROGENATION OF ALKYD RESINS

Russell Morgan, Parlin, N. J., assignor to E. I. du Pont de Nemours & Company, Wilmington, Del., a corporation of Delaware No Drawing. Application November 14, 1946, Serial No. 709,783

10 Claims. (Cl. 260—22)

This invention relates to the art of coating compositions and, more particularly, to synthetic resins and synthetic resin enamels which produce films that are resistant to yellowing.

Enamels containing synthetic resins, such as modified polyhydric alcohol-polybasic acid resins (alkyd resins), have a tendency to objectionably yellow at medium or high temperatures, and it has been proposed to overcome this defect by employing alkyd resins which have been modified with saturated oil or saturated oil acids having low iodine numbers. In spite of this, some yellowing takes place, not only in baking, but subsequently in diffused daylight, and it has been found that, if the oil or oil acid employed has too low an iodine number or has had all of its double bonds saturated by hydrogen, the resulting baked film is deficient in some desirable properties, such as hardness, gloss, and flexibility.

Since manufacturers of refrigerators, kitchen cabinets, bath room fixtures, and the like, place considerable emphasis on initial whiteness and freedom from yellowing in diffused daylight with the lapse of time, it is obvious that added improvement in color characteristics, without detriment to other desirable properties, is much to be desired.

This invention, therefore, has as its principal object the provision of alkyd resins which will produce enamels having improved initial color and improved retention of initial color under the various conditions of exposure encountered in actual service.

Another object is the provision of a method of producing oil modified alkyd resins which are resistant to yellowing upon exposure to medium or high temperatures or to diffused daylight.

A further object is the provision of oil modified alkyd resin coating compositions which produce films having improved color characteristics and possessing, in addition, satisfactory hardness, gloss, and flexibility.

These, and other objects which will be apparent as the description proceeds, are accomplished in accordance with the present invention by subjecting an oil modified alkyd resin to a catalytic hydrogenation treatment under such conditions that it takes up about 10% to 40% of the quantity of hydrogen theoretically required to completely saturate all of the acid radicals of the modifying oil.

The following examples are illustrative of the method of carrying out the invention.

Example 1

A 43% soya bean oil modified phthalic glyceride resin was dissolved in benzene, and this solution was then subjected to a hydrogenation treatment in the presence of 10% Raney nickel (see Patents 1,628,190 and 1,915,473), using a temperature of 120° C. and a pressure of 2000 pounds per square inch. After 6 hours each kilogram of solid resin had taken up 1.2 grams of hydrogen.

The total amount of hydrogen theoretically required to completely saturate all of the acid radicals of the modifying oil in this resin was calculated to be 5 grams per kilogram of resin. The amount of hydrogen therefore actually taken up during the hydrogenation was 24% of the theoretical.

After removal of the catalyst by filtration, the resin solution wash made up into a white enamel as follows:

| | Parts by weight |
|---|---|
| Titanium dioxide pigment | 25.2 |
| Butanol modified urea formaldehyde resin (solids) | 5.9 |
| Partially hydrogenated soya bean oil modified alkyd resin (solids) | 15.1 |
| Butanol | 13.8 |
| Hi-flash naphtha | 40.0 |
| | 100.0 |

The enamel was applied by spraying it onto a steel panel and baked for 30 minutes at 250° F. The resulting finish showed a cleaner color, had a better resistance to discoloration from high temperatures, and resisted yellowing in diffused daylight over longer periods than an enamel of the same composition made from the corresponding unhydrogenated alkyd resin. The hardness, gloss and flexibility of the enamel suffered no substantial impairment by this hydrogenation treatment.

When the alkyd resin of this example was hydrogenated at 150° C., other conditions remaining the same, 3.1 grams of hydrogen per kilogram of resin, or 62% of the theoretical, was taken up. An enamel made from this resin, although of excellent whiteness, was deficient in hardness, gloss, and flexibility.

Example 2

A 43% dehydrated castor oil modified alkyd resin was treated under the same conditions as those described in Example 1. The resin took up 2.8 grams of hydrogen for each kilogram of solid resin. The theoretical amount of hydrogen which would have been required to completely saturate all of the acid radicals of the modifying oil was calculated to be 7.6 grams per kilogram of resin. Thus, 37% of that theoretically required to saturate the oil had been taken up.

The white enamel made from this partially hydrogenated resin was, like that of Example 1, superior in whiteness and color retention to an enamel made from the unhydrogenated resin. Hardness, gloss, and flexibility had not been impaired.

A hydrogenation carried out at 150° C., in which 4.2 grams of hydrogen per kilogram of resin (or approximately 55%) were taken up, yielded an enamel which, although white, was deficient in hardness, gloss, and flexibility.

In carrying out this invention it has been found that, if less than 10% of the amount of hydrogen theoretically required to completely saturate all of the acid radicals of the modifying oil is taken up, there is little or no improvement; and that, if more than 40% of the theoretical is absorbed, the film characteristics, particularly hardness, gloss, and flexibility, are so greatly impaired that a white enamel made from the resin will not produce a satisfactory film.

In addition to the soya bean oil and dehydrated castor oil modified alkyd resins disclosed in the examples, alkyd resins modified with other oils or oil acids, such as linseed, Chinawood, and oiticica, may be used.

Although so-called Raney nickel was used in the examples, other hydrogenation catalysts may be employed, such as cobalt, iron, platinum, palladium, copper, or silver. The copper chromite catalyst described by Calingaert and Edgar (Ind. Eng. Chem. 26, 879 (1934)) may also be employed in this hydrogenation.

The solvent used to dissolve the oil modified alkyd resin prior to hydrogenation should be one that is not itself subject to hydrogenation under the conditions employed; e. g., benzene or its homologues.

It will be understood that where the expression "oil modified alkyd resin" is used, it includes alkyd resins in which the oil component has been introduced either in the form of the oil or the oil acids.

The partially hydrogenated alkyd resins of this invention are useful in the preparation of a wide variety of synthetic resin enamels, such as the enamels shown in Examples 1–4 of Graves Patent 2,246,095, where extreme whiteness is a desired characteristic, and where freedom from yellowing after long exposure to diffused daylight is of importance.

It is apparent that many widely different embodiments of this invention may be made without departing from the spirit and scope thereof; and, therefore, it is not intended to be limited except as indicated in the appended claims.

I claim:

1. The process of claim 10 in which the oil modified alkyd resin is a soya bean oil modified alkyd resin.

2. The process of claim 10 in which the oil modified alkyd resin is a dehydrated castor oil modified alkyd resin.

3. The process of claim 10 in which the partial hydrogenation is carried out in the presence of a hydrogenating catalyst at a temperature of 120° C.

4. The process of claim 10 in which the partial hydrogenation is carried out in the presence of a hydrogenating catalyst at a temperature of 120° C. and a pressure of 2000 pounds per square inch.

5. A non-yellowing oil modified alkyd resin in which the acid radicals of the modifying oil have been catalytically hydrogenated with 10% to 40% of the quantity of hydrogen required to completely saturate them, the oil modified alkyd resin being selected from the group which consists of drying oil modified alkyd resins and semi-drying oil modified alkyd resins.

6. The oil modified alkyd resin of claim 5 in which the modifying oil is soya bean oil.

7. The oil modified alkyd resin of claim 5 in which the modifying oil is dehydrated castor oil.

8. A coating composition comprising an oil modified alkyd resin in which the acid radicals of the modifying oil have been catalytically hydrogenated with 10% to 40% of the quantity of hydrogen required to completely saturate them, the oil modified alkyd resin being selected from the group which consists of drying oil modified alkyd resins and semi-drying oil modified alkyd resins.

9. A coating composition comprising a titanium dioxide pigment, a urea formaldehyde resin, a solvent, and an oil modified alkyd resin in which the acid radicals of the modifying oil have been catalytically hydrogenated to 10% to 40% of complete saturation, the oil modified alkyd resin being selected from the group which consists of drying oil modified alkyd resins and semi-drying oil modified alkyd resins.

10. The process of making an oil modified alkyd resin non-yellowing, which comprises catalytically hydrogenating the resin until the acid radicals of the modifying oil are 10%–40% completely saturated, the oil modified alkyd resin being selected from the group which consists of drying oil modified alkyd resins and semi-drying oil modified alkyd resins.

RUSSELL MORGAN.

REFERENCES CITED

The following references are of record in the file of this patent:

UNITED STATES PATENTS

| Number | Name | Date |
|---|---|---|
| 1,970,510 | Ellis | Aug. 14, 1934 |
| 2,051,796 | Humphrey | Apr. 18, 1936 |
| 2,260,889 | Donovan | Oct. 28, 1941 |
| 2,363,658 | Decker | Nov. 28, 1944 |
| 2,365,122 | Traylor | Dec. 12, 1944 |